United States Patent
Tang

(10) Patent No.: US 11,025,532 B2
(45) Date of Patent: Jun. 1, 2021

(54) DATA TRANSMISSION METHOD, TRANSMITTING TERMINAL DEVICE AND RECEIVING TERMINAL DEVICE

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 16/632,162

(22) PCT Filed: Aug. 23, 2017

(86) PCT No.: PCT/CN2017/098615
§ 371 (c)(1),
(2) Date: Jan. 17, 2020

(87) PCT Pub. No.: WO2019/036930
PCT Pub. Date: Feb. 28, 2019

(65) Prior Publication Data
US 2020/0252329 A1    Aug. 6, 2020

(51) Int. Cl.
*H04B 7/00* (2006.01)
*H04L 12/707* (2013.01)
(Continued)

(52) U.S. Cl.
CPC .............. *H04L 45/24* (2013.01); *H04L 1/189* (2013.01); *H04L 1/1893* (2013.01); *H04L 69/14* (2013.01); *H04W 80/02* (2013.01)

(58) Field of Classification Search
None
See application file for complete search history.

(56) References Cited

U.S. PATENT DOCUMENTS

| 2010/0226325 | A1 | 9/2010 | Chun et al. | |
| 2013/0128859 | A1* | 5/2013 | Takaoka | H04L 5/0094 370/329 |

(Continued)

FOREIGN PATENT DOCUMENTS

| CN | 102026411 A | 4/2011 |
| CN | 102104905 A | 6/2011 |

(Continued)

OTHER PUBLICATIONS

3GPP TSG-RAN2#98; Hangzhou, China, May 15-19, 2017; R2-1704834.

(Continued)

*Primary Examiner* — Gerald A Smarth

(57) ABSTRACT

The implementations of the present disclosure relate to a data transmission method, a transmitting terminal device and a receiving terminal device. The method comprises: packaging a first media access control (MAC) control element (CE) and a second MAC CE into a first transmission block (TB), and packaging a third MAC CE and a fourth MAC CE into a second TB, wherein the first MAC CE and the third MAC CE are the same MAC CE, the second MAC CE indicates a MAC CE that is the same as the first MAC CE, and the fourth MAC CE indicates a MAC CE that is the same as the third MAC CE; and transmitting the first TB to a receiving terminal device through a first carrier, and transmitting the second TB to the receiving terminal device through a second carrier.

18 Claims, 5 Drawing Sheets

(51) Int. Cl.
*H04L 1/18* (2006.01)
*H04L 29/06* (2006.01)
*H04W 80/02* (2009.01)

(56) References Cited

U.S. PATENT DOCUMENTS

| | | | |
|---|---|---|---|
| 2014/0016593 A1* | 1/2014 | Park | H04W 74/004 370/329 |
| 2014/0036685 A1* | 2/2014 | Kim | H04W 12/037 370/236 |
| 2014/0233502 A1* | 8/2014 | Fong | H04L 27/26 370/329 |
| 2016/0037526 A1* | 2/2016 | Kim | H04W 72/042 370/329 |
| 2016/0094446 A1* | 3/2016 | Kazmi | G01C 21/005 370/392 |
| 2016/0270094 A1 | 9/2016 | Dinan | |
| 2016/0345302 A1 | 11/2016 | Stattin et al. | |
| 2017/0118671 A1* | 4/2017 | Lee | H04W 4/70 |
| 2018/0199229 A1* | 7/2018 | Lee | H04W 76/14 |

FOREIGN PATENT DOCUMENTS

| | | |
|---|---|---|
| CN | 105722195 A | 6/2016 |
| EP | 3145108 A1 | 3/2017 |
| RU | 2620717 C2 | 5/2017 |
| WO | 2016064221 A1 | 4/2016 |

OTHER PUBLICATIONS

3GPP TSG RAN WG1 Meeting #86bis; R1-1609606; Lisbon, Portugal Oct. 10-14, 2016; 2 pages.

3GPP TSG-RAN WG2 #99; R2-1708102; MAC CE design for duplication; Berlin, Germany, Aug. 21-25, 2017; pp. 1-2.

3GPP TSG-RAN WG2 NR Ad Hoc; R2-1706477; Reliability Enhancement for MAC CE; Qingdao, China, Jun. 27-29, 2017; pp. 1-2.

3GPP TSG-RAN WG2 Meeting #98; R2-1705199; Reliability enhancement for MAC CE; Hangzhou, China, May 15-19, 2017; pp. 1-2.

Extended EP Search Report for European Application No. 17922260.9 dated Apr. 23, 2020.

3GPP TS 36321 V143.0 (Jun. 2017); 3rd Generation Partnership Project; Technical Specification Group Radio Access Network; Evolved Universal Terrestrial Radio Access (E-UTRA); Medium Access Control (MAC) protocol specification (Release 14).

3GPP TSG-RAN WG2 #99 R2-1708102; Berlin, Germany, Aug. 21-25, 2017.

Russia Notice of Allowance with English Translation for Ru Application 2020103559/07(005447) dated Jan. 13, 2021.

* cited by examiner

| LCID | Serving cell index |
|---|---|
| Serving cell index | Padding bit |

| LCID | | Duplication number | |
|---|---|---|---|
| Serving cell index 1 | Serving cell index 2 | | Serving cell index 3 |
| Serving cell index 3 | ... ... ... | | Padding bit |

FIG. 3

| R | LCID | Flag |
|---|---|---|

Receive a first transport block (TB) sent by a sending end device through a first carrier and a second TB sent through a second carrier, wherein the first TB includes a first media access control (MAC) control element (CE) and a second MAC CE, and the second TB includes a third MAC CE and a fourth MAC CE ~S210

Determine at least one MAC CE which is the same as the first MAC CE according to the second MAC CE, wherein the at least one MAC CE which is the same as the first MAC CE includes the third MAC CE ~S220

Determine at least one MAC CE which is the same as the third MAC CE according to the fourth MAC CE, wherein the at least one MAC CE which is the same as the third MAC CE includes the first MAC CE ~S230

FIG. 5

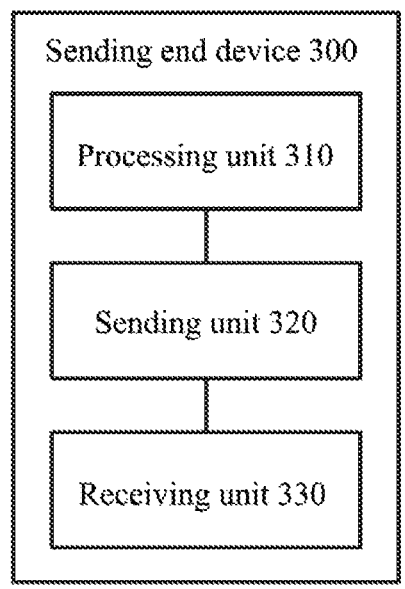

DATA TRANSMISSION METHOD, TRANSMITTING TERMINAL DEVICE AND RECEIVING TERMINAL DEVICE

CROSS-REFERENCE TO RELATED APPLICATION(S)

This application is a 371 application of International Application No. PCT/CN2017/098615, filed on Aug. 23, 2017, the entire disclosure of which is hereby incorporated by reference.

TECHNICAL FIELD

The present disclosure relates to the field of communication, in particular to a method for data transmission, a sending end device, and a receiving end device.

BACKGROUND

With people's pursuit of speed, latency, high-speed mobility, energy efficiency, and diversity and complexity of services in the future life, International Standard Organization of 3rd generation partnership project (3GPP) began to develop 5G. Main application scenarios of the 5G may be: enhance mobile broadband (eMBB), ultra reliable low latency communication (URLLC), and mass machine type of communication (mMTC).

Herein, typical applications of the URLLC may include scenarios of industrial automation, power automation, telemedicine operation (surgery), traffic safety, or the like, and reliable transmission may be ensured through various mechanisms, e.g., using a mode of data duplication of packet data convergence protocol (PDCP) for transmission in a dual connectivity (DC) and carrier aggregation (CA) scenario may improve reliability of data transmission.

However, how to improve reliability of transmission of a media access control (MAC) control element (CE) remains to be solved.

SUMMARY

The present disclosure provides a method for data transmission, a sending end device, and a receiving end device.

In a first aspect, a method for data transmission is provided, including: encapsulating a first media access control (MAC) control element (CE) and a second MAC CE to a first transport block (TB), and encapsulating a third MAC CE and a fourth MAC CE to a second TB, wherein the first MAC CE and the third MAC CE are the same MAC CE, the second MAC CE is used for indicating a MAC CE which is the same as the first MAC CE, and the fourth MAC CE is used for indicating a MAC CE which is the same as the third MAC CE; and sending the first TB to a receiving end device through a first carrier and sending the second TB to the receiving end device through a second carrier.

In combination with the first aspect, in an implementation of the first aspect, the second MAC CE includes a second logical channel ID (LCID) field and a second serving cell index field, wherein the second LCID field includes an LCID corresponding to the first MAC CE, and the second serving cell index field includes an index of a carrier on which each MAC CE in at least one MAC CE which is the same as the first MAC CE is located.

In combination with the first aspect and the implementation thereof, in another implementation of the first aspect, the fourth MAC CE includes a fourth LCID field and a fourth serving cell index field, wherein the fourth LCID field includes an LCID corresponding to the third MAC CE, and the fourth serving cell index field includes an index of a carrier on which each MAC CE in at least one MAC CE which is the same as the third MAC CE is located.

In combination with the first aspect and the implementation thereof, in another implementation of the first aspect, an index included in the second serving cell index field is an index of the second carrier, and an index included in the fourth serving cell index field is an index of the first carrier.

In combination with the first aspect and the implementation thereof, in another implementation of the first aspect, the second MAC CE includes a second duplication number field, wherein the second duplication number field is used for indicating a quantity of at least one MAC CE which is the same as the first MAC CE.

In combination with the first aspect and the implementation thereof, in another implementation of the first aspect, the fourth MAC CE includes a fourth duplication number field, wherein the fourth duplication number field is used for indicating a quantity of at least one MAC CE which is the same as the third MAC CE.

In combination with the first aspect and the implementation thereof, in another implementation of the first aspect, the second MAC CE includes a second LCID field and a second indication field, wherein the second LCID field includes an LCID corresponding to the first MAC CE, and the second indication field is used for indicating that the third MAC CE which is the same as the first MAC CE exists.

In combination with the first aspect and the implementation thereof, in another implementation of the first aspect, the fourth MAC CE includes a fourth LCID field and a fourth indication field, wherein the fourth LCID field includes an LCID corresponding to the third MAC CE, and the fourth indication field is used for indicating that the first MAC CE which is the same as the third MAC CE exists.

In combination with the first aspect and the implementation thereof, in another implementation of the first aspect, before sending the first TB to the receiving end device through the first carrier and sending the second TB to the receiving end device through the second carrier, the method further includes: receiving a Radio Resource Control (RRC) message sent by the receiving end device, wherein the RRC message is used for indicating the first carrier is used for transmitting the first MAC CE and the second carrier is used for transmitting the third MAC CE.

In combination with the first aspect and the implementation thereof, in another implementation of the first aspect, the method further includes: performing a duplication processing on the first MAC CE to obtain at least one MAC CE which is the same as the first MAC CE, wherein the at least one MAC CE includes the third MAC CE.

In combination with the first aspect and the implementation thereof, in another implementation of the first aspect, same multiple MAC CEs are encapsulated in different TBs, wherein the different TBs are sent through different carriers.

In a second aspect, a method for data transmission is provided, including: receiving a first transport block (TB) sent by a sending end device through a first carrier and a second TB sent through a second carrier, wherein the first TB includes a first media access control (MAC) control element (CE) and a second MAC CE, and the second TB includes a third MAC CE and a fourth MAC CE; determining at least one MAC CE which is the same as the first MAC CE according to the second MAC CE, wherein the at least one MAC CE which is the same as the first MAC CE includes the third MAC CE; and determining at least one MAC CE which is the same as the third MAC CE according to the fourth MAC CE, wherein the at least one MAC CE which is the same as the third MAC CE includes the first MAC CE.

In combination with the second aspect, in an implementation of the second aspect, the second MAC CE includes a second logical channel ID (LCID) field and a second serving cell index field, the fourth MAC CE includes a fourth LCID field and a fourth serving cell index field; the determining the at least one MAC CE which is the same as the first MAC CE according to the second MAC CE, includes: determining the first MAC CE according to the second LCID field; and determining a carrier on which each MAC CE in the at least one MAC CE which is the same as the first MAC CE is located, according to the second serving cell index field; the determining the at least one MAC CE which is the same as the third MAC CE according to the fourth MAC CE, includes: determining the third MAC CE according to the fourth LCID field; and determining a carrier on which each MAC CE in the at least one MAC CE which is the same as the third MAC CE is located, according to the fourth serving cell index field.

In combination with the second aspect and the implementation thereof, in another implementation of the second aspect, an index included in the second serving cell index field is an index of the second carrier, and an index included in the fourth serving cell index field is an index of the first carrier.

In combination with the second aspect and the implementation thereof, in another implementation of the second aspect, the second MAC CE includes a second duplication number field, the fourth MAC CE includes a fourth duplication number field; the determining the at least one MAC CE which is the same as the first MAC CE according to the second MAC CE, includes: determining a quantity of the at least one MAC CE which is the same as the first MAC CE according to the second duplication number field; and the determining the at least one MAC CE which is the same as the third MAC CE according to the fourth MAC CE, includes: determining a quantity of the at least one MAC CE which is the same as the third MAC CE according to the fourth duplication number field.

In combination with the second aspect and the implementation thereof, in another implementation of the second aspect, the second MAC CE includes a second LCID field and a second indication field, the fourth MAC CE includes a fourth LCID field and a fourth indication field; the determining the at least one MAC CE which is the same as the first MAC CE according to the second MAC CE, includes: determining the first MAC CE according to the second LCID field; and determining the third MAC CE which is the same as the first MAC CE exists, according to the second indication field; the determining the at least one MAC CE which is the same as the third MAC CE according to the fourth MAC CE, includes: determining the third MAC CE according to the fourth LCID field; and determining that the first MAC CE which is the same as the third MAC CE exists, according to the fourth indication field.

In combination with the second aspect and the implementation thereof, in another implementation of the second aspect, before receiving the first TB sent by the sending end device through the first carrier and the second TB sent through the second carrier, the method further includes: sending a Radio Resource Control (RRC) message to the sending end device, wherein the RRC message is used for indicating the first carrier is used for transmitting the first MAC CE and the second carrier is used for transmitting the third MAC CE.

In a third aspect, a sending end device is provided, for performing the method in the first aspect or any possible implementation of the first aspect. Specifically, the sending end device includes units for performing the method in the first aspect or any possible implementation of the first aspect.

In a fourth aspect, a receiving end device is provided, for performing the method in the second aspect or any possible implementation of the second aspect. Specifically, the receiving end device includes units for performing the method in the second aspect or any possible implementation of the second aspect.

In a fifth aspect, a sending end device is provided, including a memory and a processor, wherein the memory is used for storing instructions, the processor is used for executing the instructions stored in the memory, and when the processor executes the instructions stored in the memory, the execution causes the processor to execute the method in the first aspect or any possible implementation of the first aspect.

In a sixth aspect, a receiving end device is provided, including a memory and a processor, wherein the memory is used for storing instructions, the processor is used for executing the instructions stored in the memory, and when the processor executes the instructions stored in the memory, the execution causes the processor to execute the method in the second aspect or any possible implementation of the second aspect.

In a seventh aspect, a computer readable medium is provided, for storing a computer program, wherein the computer program includes instructions for executing the method of the first aspect or any possible implementation of the first aspect.

In an eighth aspect, a computer readable medium is provided, for storing a computer program, wherein the computer program includes instructions for executing the method in the second aspect or any possible implementation of the second aspect.

In a ninth aspect, a computer program product including instructions is provided, wherein when a computer runs the instructions of the computer program product, the computer performs the method for data transmission in the first aspect or any possible implementation of the first aspect. Specifically, the computer program product may be run on the sending end device of the third aspect.

In a tenth aspect, a computer program product including instructions is provided, wherein when a computer runs the instructions of the computer program product, the computer performs the method for data transmission in the second aspect or any possible implementation of the second aspect. Specifically, the computer program product may be run on the receiving end device of the fourth aspect.

BRIEF DESCRIPTION OF DRAWINGS

FIG. 3 shows another schematic diagram of a second MAC CE or a fourth MAC CE according to an implementation of the present disclosure.

FIG. 4 shows yet another schematic diagram of a second MAC CE or a fourth MAC CE according to an implementation of the present disclosure.

FIG. 5 is another schematic flowchart of a method for data transmission according to an implementation of the present disclosure.

FIG. 6 is a schematic block diagram of a sending end device according to an implementation of the present disclosure.

DETAILED DESCRIPTION

Hereinafter, technical solutions in the implementations of the present disclosure will be described with reference to the accompanying drawings.

It should be understood that the technical solutions of the implementations of the present disclosure may be applied to various communication systems, for example, a Long Term Evolution (LTE) system, an LTE frequency division duplex (FDD) system, LTE time division duplex (TDD), a 4.5th generation (4.5G) network, a 5th generation (5G) network, NR.

A terminal device involved in the implementations of the present disclosure may be a mobile phone, a Pad, a computer with wireless transceiving function, a virtual reality (VR) terminal device, an augmented reality (AR) terminal device, a wireless terminal in industrial control, a wireless terminal in self driving, a wireless terminal in remote medical surgery, a wireless terminal in smart grid, a wireless terminal in transportation safety, a wireless terminal in smart city, a wireless terminal in smart home, etc.

A network device involved in the implementations of the present disclosure is an apparatus deployed in a wireless access network to provide wireless communication functions for a terminal device. The network device may be a base station, which may include various forms of macro base station, micro base station, relay station, access point, etc. In systems adopting different radio access technologies, names of devices with functions of base stations may be different. For example, in an LTE network, it is called an evolved Node B (eNB or eNodeB), and in a 3rd Generation (3G) network, it is called a Node B, etc.

A network device and a terminal device may be deployed on land, including indoors or outdoors, hand-held or vehicle-mounted; or may be deployed on a water surface; or may be deployed on a plane, a balloon, and a satellite in the air. The implementations of the present disclosure do not limit application scenarios of a base station and a terminal device.

Figures 1, 2:
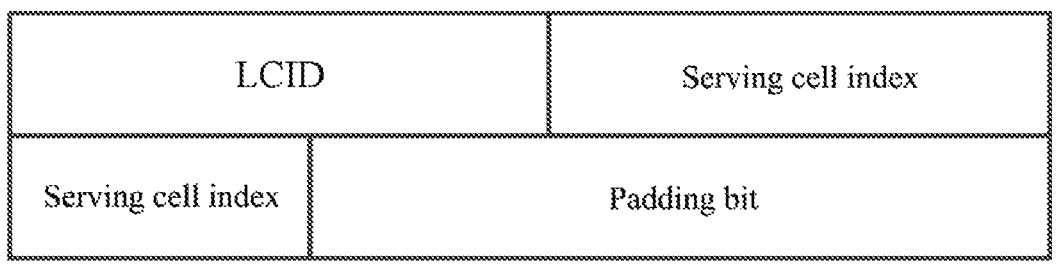
FIG. 1 is a schematic flow chart of a method for data transmission according to an implementation of the present disclosure.
FIG. 2 shows a schematic diagram of a second MAC CE or a fourth MAC CE according to an implementation of the present disclosure.

FIG. 1 shows a schematic flow chart of a method 100 for data transmission according to an implementation of the present disclosure. The method 100 may be executed by a sending end device, specifically, the sending end device may be a network device, or may be a terminal device. For example, when the sending end device is a network device, the receiving end device may be a terminal device, and when the sending end device is a terminal device, the receiving end device may be a network device or another terminal device, and the implementations of the present disclosure are not limited thereto.

As shown in FIG. 1, the method 100 includes acts S110 and S120. In act S110, a first media access control (MAC) control element (CE) and a second MAC CE are encapsulated to a first transport block (TB), and a third MAC CE and a fourth MAC CE are encapsulated to a second TB, wherein the first MAC CE and the third MAC CE are the same MAC CE, the second MAC CE is used for indicating a MAC CE which is the same as the first MAC CE, and the fourth MAC CE is used for indicating a MAC CE which is the same as the third MAC CE; and in act S120, the first TB is sent to a receiving end device through a first carrier, and the second TB is sent to the receiving end device through a second carrier.

In the implementation of the present disclosure, the sending end device may perform duplication for any MAC CE to obtain multiple same MAC CEs. Here, taking any two same MAC CEs included in the multiple same MAC CEs as an example to illustrate, the any two MAC CEs are respectively the first MAC CE and the third MAC CE. Herein, the multiple same MAC CEs correspond to a same logical channel ID (LCID).

In the implementation of the present disclosure, the first MAC CE and the third MAC CE are respectively encapsulated in different TBs, and the different TBs is mapped to different carriers. Specifically, the first MAC CE may be encapsulated in the first TB, wherein the first TB is mapped to the first carrier, i.e., the sending end device sends the first TB to the receiving end device through the first carrier; or the third MAC CE may be encapsulated in the second TB, wherein the second TB is mapped to the second carrier, i.e., the sending end device sends the second TB to the receiving end device through the second carrier.

Optionally, the first TB may also include the second MAC CE, through which whether a duplicated MAC CE exists is indicated, that is, the second MAC CE is used for indicating whether at least one MAC CE which is the same as the first MAC CE in the first TB exists, wherein the at least one MAC CE does not include the first MAC CE; similarly, the second TB also includes the fourth MAC CE, through which whether a duplicated MAC CE exists may also be indicated, that is, the fourth MAC CE is used for indicating whether at least one MAC CE which is the same as the third MAC CE in the second TB exists, wherein the at least one MAC CE does not include the third MAC CE.

It should be understood that the second MAC CE and the fourth MAC CE may be any existing MAC CE. For example, an indication field may be added to any existing MAC CE, and whether a duplicated MAC CE exists is indicated through the indication field and the duplicated MAC CE is determined through the indication field. Or, the second MAC CE and the fourth MAC CE may be a new MAC CE, and a new LCID is defined for the new MAC CE, and the new MAC CE is indicated through the new LCID.

The following will take the second MAC CE and the fourth MAC CE being a new MAC CE as an example to illustrate.

Optionally, as one implementation, FIG. 2 shows a schematic diagram of a second MAC CE or a fourth MAC CE according to an implementation of the present disclosure. An MAC CE shown in FIG. 2 may be the second MAC CE, or may be the fourth MAC CE, and the MAC CE may include an LCID field and a serving cell index field. In addition, the MAC CE may also include a padding bit field.

Specifically, the MAC CE shown in FIG. 2 may be the second MAC CE, which may include a second LCID field and a second serving cell index field, wherein the second LCID field is an LCID field shown in FIG. 2, and the second serving cell index field is a serving cell index field shown in FIG. 2. Herein, the second LCID field includes an LCID corresponding to a first MAC CE, that is, an LCID corresponding to at least one MAC CE which is the same as the first MAC CE, so that a receiving end device determines the first MAC CE and the at least one MAC CE which is the same as the first MAC CE, according to the second LCID field of the second MAC CE in the first TB; and the second serving cell index field includes an index of a carrier corresponding to each MAC CE in the at least one MAC CE which is the same as a first MAC CE, so that a receiving end device determines a carrier on which the at least one MAC CE which is the same as the first MAC CE is located, according to the second serving cell index field of the second MAC CE in the first TB.

Similarly, when the MAC CE shown in FIG. 2 is the fourth MAC CE, the fourth MAC CE may include a fourth LCID field and a fourth serving cell index field, wherein the fourth LCID field is the LCID field shown in FIG. 2, and the fourth serving cell index field is the serving cell index field shown in FIG. 2. Herein, the fourth LCID field includes an LCID corresponding to a third MAC CE, that is, an LCID corresponding to at least one MAC CE which is the same as the third MAC CE, so that a receiving end device determines the third MAC CE and at least one MAC CE which is the same as the third MAC CE, according to the fourth LCID field of the fourth MAC CE in the second TB; and the fourth serving cell index field includes an index of a carrier corresponding to each MAC CE in the at least one MAC CE which is the same as the third MAC CE, so that the receiving end device determines a carrier on which the at least one MAC CE which is the same as the third MAC CE is located, according to the fourth serving cell index field of the fourth MAC CE in the second TB.

For example, taking duplicating a first MAC CE once to obtain a third MAC CE as an example, the first MAC CE and a second MAC CE are encapsulated in a first TB and transmitted through a first carrier; and the third MAC CE and a fourth MAC CE are encapsulated in a second TB and transmitted through a second carrier. Specifically, a second LCID field of the second MAC CE in the first TB includes an LCID corresponding to the first MAC CE and the third MAC CE, and the second serving cell index field of the second MAC CE includes an index of a carrier on which the third MAC CE which is the same as the first MAC CE is located, that is, includes an index of the second carrier. A fourth LCID field of the fourth MAC CE in the second TB includes an LCID corresponding to the first MAC CE and the third MAC CE, and a fourth serving cell index field of the fourth MAC CE includes an index of a carrier on which the first MAC CE which is the same as the third MAC CE is located, that is, includes an index of the first carrier.

Optionally, a length of each field in the second MAC CE and the fourth MAC CE may be arbitrarily set, for example, as shown in FIG. 2, a length of the second LCID field in the second MAC CE or a length of the fourth LCID field in the fourth MAC CE may be 6 bits; a length of the second serving cell index field in the second MAC CE or a length of the fourth serving cell index field in the fourth MAC CE may be 3 bits; in addition, filling may be performed through padding. However, the implementations of the present disclosure are not limited thereto.

Optionally, as one implementation, FIG. 3 shows another schematic diagram of a second MAC CE or a fourth MAC CE according to an implementation of the present disclosure. A MAC CE shown in FIG. 3 may be the second MAC CE, or may be the fourth MAC CE, and the MAC CE may include an LCID field, a duplication number field, and a serving cell index field. In addition, the MAC CE may also include a padding bit field.

Specifically, the MAC CE shown in FIG. 3 may be a second MAC CE, which may include a second LCID field, a second duplication number field, and a second serving cell index field, wherein the second LCID field is an LCID field shown in FIG. 3, the duplication number field is a duplication number field shown in FIG. 3, and the second serving cell index field is a serving cell index field shown in FIG. 3. Herein, the second LCID field includes an LCID corresponding to a first MAC CE, that is, an LCID corresponding to the at least one MAC CE which is the same as the first MAC CE, so that a receiving end device determines the first MAC CE and at least one MAC CE which is the same as the first MAC CE, according to the second LCID field of the second MAC CE in the first TB. The second duplication number field is used for indicating a quantity of the at least one MAC CE which is the same as the first MAC CE, for example, the first MAC CE is duplicated to obtain a total of 4 MAC CEs which are the same as the first MAC CE, and the 4 MAC CEs do not include the first MAC CE, then the second duplication number field may be used for indicating a quantity is 4, so that the receiving end device determines there are 4 MAC CEs which are the same as the first MAC CE in the first TB, according to the second duplication number field. The second serving cell index field includes an index of a carrier corresponding to each MAC CE in the at least one MAC CE which is the same as the first MAC CE, for example, a quantity is indicated to be 4 through the second duplication number field, then the second serving cell index field includes indexes of carriers on which the 4 MAC CEs are located, so that the receiving end device determines a carrier on which each MAC CE in the at least one MAC CE which is the same as the first MAC CE is located, according to the second serving cell index field of the second MAC CE in the first TB, wherein since the third MAC CE is one of the at least one MAC CE which is the same as the first MAC CE, then an index in the second serving cell index field in the second MAC CE includes an index of a carrier corresponding to the third MAC CE, i.e., includes an index of a second carrier.

Similarly, when the MAC CE shown in FIG. 3 is a fourth MAC CE, the fourth MAC CE may include a fourth LCID field, a fourth duplication number field, and a fourth serving cell index field, wherein the fourth LCID field is the LCID field shown in FIG. 3, the fourth duplication number field is the duplication number field shown in FIG. 3, and the fourth serving cell index field is the serving cell index field shown in FIG. 3. Herein, the fourth LCID field includes an LCID corresponding to a third MAC CE, that is, an LCID corresponding to at least one MAC CE which is the same as the third MAC CE, so that a receiving end device determines the third MAC CE and the at least one MAC CE which is the same as the third MAC CE, according to the fourth LCID field of the fourth MAC CE in the second TB. The fourth duplication number field is used for indicating a quantity of the at least one MAC CE which is the same as the third MAC CE, for example, the first MAC CE is duplicated to obtain the total of 4 MAC CEs which are the same as the first MAC CE and the 4 MAC CEs include the third MAC CE, then as for the third MAC CE, there are also 4 MAC CEs which are the same as the third MAC CE, and the 4 MAC CEs include the first MAC CE but does not include the third MAC CE, then the fourth duplication number field may be used for indicating that a quantity is 4, so that the receiving end device determines that there are 4 MAC CEs which are the same as the third MAC CE in the second TB, according to the fourth duplication number field. The fourth serving cell index field includes an index of a carrier corresponding to each MAC CE in the at least one MAC CE which is the same as the third MAC CE, for example, it is indicated that there are 4 MAC CEs which are the same as the third MAC CE according to the fourth duplication number field, then the fourth serving cell index field includes an index of a carrier corresponding to each MAC CE in the 4 MAC CEs, so that the receiving end device determines a carrier on which the at least one MAC CE which is the same as the third MAC CE is located, according to the fourth serving cell index field of the fourth MAC CE in the second TB, wherein since the first MAC CE is one of the at least one MAC CE which is the same as the third MAC CE, then an index in the fourth serving cell index field in the fourth MAC CE includes an index of a carrier corresponding to the first MAC CE, i.e., includes an index of a first carrier.

For example, taking duplicating a first MAC CE once to obtain a third MAC CE as an example, the first MAC CE and a second MAC CE are encapsulated in a first TB and transmitted through a first carrier; the third MAC CE and a fourth MAC CE are encapsulated in a second TB and transmitted through a second carrier. Specifically, a second LCID field of the second MAC CE in the first TB includes LCIDs corresponding to the first MAC CE and the third MAC CE, a second duplication number field of the second MAC CE indicates that a quantity is 1, that is, only one MAC CE which is the same as the first MAC CE is included, and a second serving cell index field of the second MAC CE includes an index of a carrier on which the third MAC CE which is the same as the first MAC CE is located, that is, includes an index of a second carrier. A fourth LCID field of the fourth MAC CE in the second TB includes LCIDs corresponding to the first MAC CE and the third MAC CE, the fourth duplication number field indicates that a quantity is 1, that is, only one MAC CE which is the same as the third MAC CE is included, and a fourth serving cell index field of the fourth MAC CE includes an index of a carrier on which the first MAC CE which is the same as the third MAC CE is located, that is, includes an index of a first carrier.

For another example, taking duplicating a first MAC CE for multiple times to obtain a total of 5 MAC CEs including the first MAC CE as an example, any two MAC CEs of the 5 MAC CEs are the first MAC CE and a third MAC CE respectively. The first MAC CE and a second MAC CE are encapsulated in a first TB and transmitted through a first carrier; the third MAC CE and a fourth MAC CE are encapsulated in a second TB and transmitted through a second carrier. Specifically, a second LCID field of the second MAC CE in the first TB includes an LCID corresponding to all of the first MAC CE and other MAC CEs which are the same as the first MAC CE; a second duplication number field of the second MAC CE indicates that a quantity is 4, that is, 4 MAC CEs which are the same as the first MAC CE are totally included; a second serving cell index field of the second MAC CE includes an index of a carrier on which each MAC CE in the other 4 MAC CEs which are the same as the first MAC CE is located, including an index of the second carrier corresponding to the third MAC CE which is the same as the first MAC CE. A fourth LCID field of the fourth MAC CE in the second TB includes an LCID corresponding to all of the third MAC CE and other MAC CEs which are the same as the third MAC CE, the fourth duplication number field indicates that a quantity is 4, that is, 4 MAC CEs which are the same as the third MAC CE are totally included, and a fourth serving cell index field of the fourth MAC CE includes an index of a carrier on which each MAC CE in the 4 MAC CEs which are the same as the third MAC CE is located, including an index of the first carrier corresponding to the first MAC CE which is the same as the third MAC CE.

Optionally, a length of each field in the second MAC CE and the fourth MAC CE may be arbitrarily set, for example, as shown in FIG. 3, a length of the second LCID field in the second MAC CE or a length of the fourth LCID field in the fourth MAC CE may be 6 bits; a length of the second duplication number field in the second MAC CE or a length of the fourth duplication number field in the fourth MAC CE may be 2 bits or 3 bits; a length of the second serving cell index field in the second MAC CE or a length of the fourth serving cell index field in the fourth MAC CE is related to a quantity obtained from duplication, wherein a length of each serving cell index may be 3 bits; in addition, filling may be performed through padding. However, the implementations of the present disclosure are not limited thereto.

Optionally, as one implementation, FIG. 4 shows yet another schematic diagram of a second MAC CE or a fourth MAC CE according to an implementation of the present disclosure. For example, taking duplicating any MAC CE once to obtain a total of two same MAC CEs as an example, the two same MAC CEs are a first MAC CE and a third MAC CE respectively, which may correspondingly be indicated through the second MAC CE or the fourth MAC CE as shown in FIG. 4. A MAC CE shown in FIG. 4 includes an LCID field and a flag field, and may further include a reserved bit R.

Specifically, a receiving end device and a sending end device may semi-statically configure a carrier which is used for transmitting a same MAC CE through RRC. For example, the receiving end device may send an RRC message to the sending end device, wherein the RRC message is used for indicating the sending end device to transmit two same MAC CEs through a first carrier and a second carrier, for example, a first MAC CE may be transmitted through the first carrier, a third MAC CE may be transmitted through the second carrier.

For example, take a sending end device being a terminal device and a receiving end device being a network device as an example. The network device may configure a carrier for the terminal device through an RRC message, that is, the network device sends an RRC message to the terminal device, wherein the RRC message is used for indicating the terminal device to send a same MAC CE through a first carrier and a second carrier, then for two same MAC CEs, that is, a first MAC CE and a third MAC CE, the terminal device may transmit the first MAC CE through the first carrier and transmit the third MAC CE through the second carrier, according to the RRC message.

Since the sending end device and the receiving end device may configure the carrier for transmitting the same MAC CE through the RRC message, for example, the first MAC CE is transmitted through the first carrier and the third MAC CE is transmitted through the second carrier, then the corresponding second MAC CE and fourth MAC CE may be as shown in FIG. 4.

Specifically, the MAC CE as shown in FIG. 4 may be a second MAC CE, which may include a second LCID field and a second indication field, wherein, the second LCID field may be an LCID field as shown in FIG. 4, and the second indication field may be a flag field as shown in FIG. 4. Herein, the second LCID field includes an LCID corresponding to the first MAC CE, that is, an LCID corresponding to the at least one MAC CE which is the same as the first MAC CE, that is, an LCID corresponding to the first MAC CE and the third MAC CE, so that the receiving end device determines the first MAC CE and the third MAC CE, according to the second LCID field of the second MAC CE in the first TB; the second indication field is used for indicating whether a MAC CE which is the same as the first MAC CE exists, for example, that a flag being set to 1 represents the MAC CE which is the same as the first MAC CE exists, otherwise represents the MAC CE which is the same as the first MAC CE does not exist, so that the receiving end device determines that at least one MAC CE which is the same as the first MAC CE in the first TB of the first carrier exists according to the second indication field of the second MAC CE in the first TB, and determines a carrier on which the MAC CE which is the same as the first MAC CE is located according to the RRC message, for example, that the third MAC CE which is the same as the first MAC CE corresponds to the second carrier may be determined according to the RRC message.

Similarly, the MAC CE as shown in FIG. 4 may also be a fourth MAC CE, which may include a fourth LCID field and a fourth indication field, wherein the fourth LCID field may be the LCID field as shown in FIG. 4, and the fourth indication field may be the flag field as shown in FIG. 4. Herein, the fourth LCID field includes an LCID corresponding to a third MAC CE, that is, an LCID corresponding to at least one MAC CE which is the same as the third MAC CE, that is, an LCID corresponding to a first MAC CE and the third MAC CE, so that a receiving end device determines the first MAC CE and the third MAC CE according to the fourth LCID field of the fourth MAC CE in the second TB; the fourth indication field is used for indicating whether a MAC CE which is the same as the third MAC CE exists, for example, that a flag being set to 1 represents the MAC CE which is the same as the third MAC CE exists, otherwise, represents the MAC CE which is the same as the third MAC CE does not exist, so that the receiving end device determines at least one MAC CE which is the same as the third MAC CE in the second TB of the second carrier exists according to the fourth indication field of the fourth MAC CE in the second TB, and determines a carrier on which the MAC CE which is the same as the third MAC CE is located according to the RRC message, for example, that the first MAC CE which is the same as the third MAC CE corresponds to a first carrier may be determined according to the RRC message.

It should be understood that a length of each field in the second MAC CE and the fourth MAC CE may be arbitrarily set, for example, a length of the second LCID field in the second MAC CE or a length of the fourth LCID field in the fourth MAC CE may be 6 bits; a length of the second indication field in the second MAC CE or a length of the fourth indication field in the fourth MAC CE may be 1 bit or 2 bits. If the length is 1 bit, then the second MAC CE and the fourth MAC CE may also include a reserved bit of 1 bit. However, the implementations of the present disclosure are not limited thereto.

In the implementation of the present disclosure, a sending end device sends a first TB including a first MAC CE and a second MAC CE through a first carrier, and sends a second TB including a third MAC CE and a fourth MAC CE through a second carrier, so that a receiving end device may receive the first carrier and the second carrier, and determine multiple same MAC CEs according to the second MAC CE and the fourth MAC CE, wherein the multiple same MAC CEs include the first MAC CE and the third MAC CE, and the receiving end device may select one MAC CE in the multiple same MAC CEs to save and apply.

Therefore, according to the method for data transmission in the implementation of the present disclosure, a first MAC CE and a second MAC CE are encapsulated in a first TB and transmitted through a first carrier, and a third MAC CE and a fourth MAC CE are encapsulated in the second TB and transmitted through a second carrier, wherein the first MAC CE and the third MAC CE are the same MAC CE, the second MAC CE is used for indicating that a MAC CE which is the same as the first MAC CE exists, and the fourth MAC CE is used for indicating that a MAC CE which is the same as the third MAC CE exists, so that sending a duplicated MAC CE through different carriers is achieved, reliability of transmission of a MAC CE is improved; and that through another MAC CE, a receiving end device may be assisted to receive and identify the duplicated and transmitted MAC CEs, so that the receiving end device only performs an operation behavior indicated by a MAC CE once, and an erroneous operation may be avoided.

The method for data transmission according to the implementations of the present disclosure is described in detail above from the perspective of a sending end device in combination with FIGS. 1 to 4. The method for data transmission according to the implementations of the present disclosure will be described below from the perspective of a receiving end device in combination with FIG. 5.

FIG. 5 shows a schematic flow chart of a method 200 for data transmission according to an implementation of the present disclosure, and the method 200 may be performed by a receiving end device. As shown in FIG. 5, the method 200 includes acts S210-S230. In act S210, a first TB sent by a sending end device through a first carrier and a second TB sent by the sending end device through a second carrier are received, wherein the first TB includes a first MAC CE and a second MAC CE, and the second TB includes a third MAC CE and a fourth MAC CE; in act S220, at least one MAC CE which is the same as the first MAC CE is determined according to the second MAC CE, wherein the at least one MAC CE which is the same as the first MAC CE includes the third MAC CE; and in act S230, at least one MAC CE which is the same as the third MAC CE is determined according to the fourth MAC CE, wherein the at least one MAC CE which is the same as the third MAC CE includes the first MAC CE.

Optionally, the second MAC CE includes a second LCID field and a second serving cell index field, wherein the fourth MAC CE includes a fourth LCID field and a fourth serving cell index field; the at least one MAC CE which is the same as the first MAC CE is determined according to the second MAC CE, including: the first MAC CE is determined according to the second LCID field; and a carrier on which each MAC CE in the at least one MAC CE which is the same as the first MAC CE is located is determined according to the second serving cell index field; and the at least one MAC CE which is the same as the third MAC CE is determined according to the fourth MAC CE, including: the third MAC CE is determined according to the fourth LCID field; and a carrier on which each MAC CE in the at least one MAC CE which is the same as the third MAC CE is located is determined according to the fourth serving cell index field.

Optionally, an index included in the second serving cell index field is an index of the second carrier, and an index included in the fourth serving cell index field is an index of the first carrier.

Optionally, the second MAC CE includes a second duplication number field, the fourth MAC CE includes a fourth duplication number field; the at least one MAC CE which is the same as the first MAC CE is determined according to the second MAC CE, including: a quantity of the at least one MAC CE which is the same as the first MAC CE is determined according to the second duplication number field; and the at least one MAC CE which is the same as the third MAC CE is determined according to the fourth MAC CE, including: a quantity of the at least one MAC CE which is the same as the third MAC CE is determined according to the fourth duplication number field.

Optionally, the second MAC CE includes a second LCID field and a second indication field, the fourth MAC CE includes a fourth LCID field and a fourth indication field; the at least one MAC CE which is the same as the first MAC CE is determined according to the second MAC CE, including: the first MAC CE is determined according to the second LCID field; and the third MAC CE which is the same as the first MAC CE exists is determined according to the second indication field; and the at least one MAC CE which is the same as the third MAC CE is determined according to the fourth MAC CE, including: the third MAC CE is determined according to the fourth LCID field; and the first MAC CE which is the same as the third MAC CE exists is determined according to the fourth indication field.

Optionally, before the first TB sent by the sending end device through the first carrier and the second TB sent through the second carrier are received, the method 200 further includes: an RRC message is sent to the sending end device, wherein the RRC message is used for indicating the first carrier is used for transmitting the first MAC CE and the second carrier is used for transmitting the third MAC CE.

It should be understood that the receiving end device in the method 200 may correspond to the receiving end device in the method 100, and the sending end device in the method 200 may correspond to the sending end device in the method 100, which will not be repeated here.

Therefore, according to the method for data transmission in the implementation of the present disclosure, a receiving end device receives a first TB in a first carrier and a second TB in a second carrier, wherein the first TB includes a first MAC CE and a second MAC CE, the second TB includes a third MAC CE and a fourth MAC CE, a MAC CE which is the same as the first MAC CE may be determined according to the second MAC CE, and a MAC CE which is the same as the third MAC CE may be determined according to the fourth MAC CE, so that reception of duplicated MAC CEs transmitted through different carriers is achieved, reliability of transmission of a MAC CE is improved; and that through another MAC CE, the receiving end device may be assisted to receive and identify the duplicated and transmitted MAC CEs, and to perform an operation behavior indicated by a MAC CE only once, and an erroneous operation may be avoided.

It should be understood that in various implementations of the present disclosure, sequence numbers of the various processes do not imply an order of execution of the various processes, which should be determined by their functions and internal logics, and should not constitute any limitation on implementation processes of the implementations of the present disclosure.

The method for data transmission according to the implementations of the present disclosure is described in detail above in combination with FIGS. 1 to 5. A sending end device and a receiving end device according to implementations of the present disclosure will be described below in combination with FIGS. 6 to 9.

As shown in FIG. 6, a sending end device 300 according to an implementation of the present disclosure includes a processing unit 310, a sending unit 320, and optionally, a receiving unit 330.

Specifically, the processing unit 310 is used for: encapsulating a first MAC CE and a second MAC CE to a first TB, and encapsulating a third MAC CE and a fourth MAC CE to a second TB, wherein the first MAC CE and the third MAC CE are the same MAC CE, the second MAC CE is used for indicating a MAC CE which is the same as the first MAC CE, and the fourth MAC CE is used for indicating a MAC CE which is the same as the third MAC CE; and the sending unit 320 is used for sending the first TB to a receiving end device through a first carrier and sending the second TB to the receiving end device through a second carrier.

Optionally, the second MAC CE includes a second LCID field and a second serving cell index field, wherein the second LCID field includes an LCID corresponding to the first MAC CE, and the second serving cell index field includes an index of a carrier on which each MAC CE in at least one MAC CE which is the same as the first MAC CE is located.

Optionally, the fourth MAC CE includes a fourth LCID field and a fourth serving cell index field, wherein the fourth LCID field includes an LCID corresponding to the third MAC CE and the fourth serving cell index field includes an index of a carrier on which each MAC CE in at least one MAC CE which is the same as the third MAC CE is located.

Optionally, an index included in the second serving cell index field is an index of the second carrier, and an index included in the fourth serving cell index field is an index of the first carrier.

Optionally, the second MAC CE includes a second duplication number field, wherein the second duplication number field is used for indicating a quantity of at least one MAC CE which is the same as the first MAC CE.

Optionally, the fourth MAC CE includes a fourth duplication number field, wherein the fourth duplication number field is used for indicating a quantity of at least one MAC CE which is the same as the third MAC CE.

Optionally, the second MAC CE includes a second LCID field and a second indication field, wherein the second LCID field includes an LCID corresponding to the first MAC CE, and the second indication field is used for indicating that the third MAC CE which is the same as the first MAC CE exists.

Optionally, the fourth MAC CE includes a fourth LCID field and a fourth indication field, wherein the fourth LCID field includes an LCID corresponding to the third MAC CE, and the fourth indication field is used for indicating that the first MAC CE which is the same as the third MAC CE exists.

Optionally, the receiving unit 330 is used for: receiving an RRC message sent by the receiving end device, before the sending unit 320 sends the first TB to the receiving end device through the first carrier and sends the second TB to the receiving end device through the second carrier, wherein the RRC message is used for indicating the first carrier is used for transmitting the first MAC CE and the second carrier is used for transmitting the third MAC CE.

It should be understood that the sending end device 300 according to the implementation of the present disclosure may correspondingly perform the method 100 in the implementations of the present disclosure, and the above and other operations and/or functions of each unit in the sending end device 300 are respectively for achieving the corresponding flow of the sending end device in each method in FIGS. 1 to 5, and will not be repeated here for the sake of brevity.

Therefore, the sending end device of the implementation of the present disclosure encapsulates the first MAC CE and the second MAC CE in the first TB and transmits through the first carrier, and encapsulates the third MAC CE and the fourth MAC CE in the second TB and transmits through the second carrier, wherein the first MAC CE and the third MAC CE are the same MAC CE, the second MAC CE is used for indicating a MAC CE which is the same as the first MAC CE exists, and the fourth MAC CE is used for indicating that a MAC CE which is the same as the third MAC CE exists, so that sending duplicated MAC CEs through different carriers is achieved, reliability of transmission of a MAC CE is improved; and that through another MAC CE, the receiving end device may be assisted to receive and identify the duplicated and transmitted MAC CEs, so that the receiving end device only performs an operation behavior indicated by the MAC CE once, and an erroneous operation may be avoided.

Figure 7:
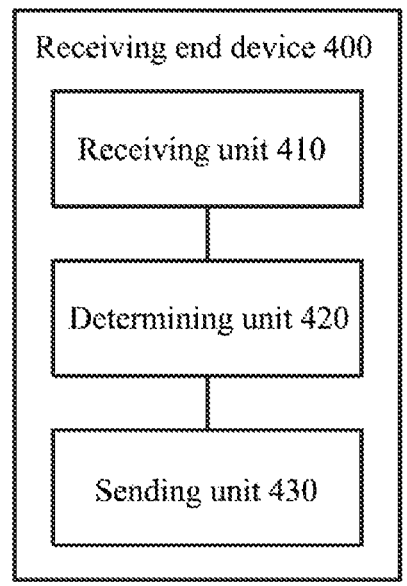
FIG. 7 is a schematic block diagram of a receiving end device according to an implementation of the present disclosure.

As shown in FIG. 7, a receiving end device 400 according to an implementation of the present disclosure includes a receiving unit 410, a determining unit 420, and optionally, a sending unit 430.

Specifically, the receiving unit 410 is used for receiving a first TB sent by a sending end device through a first carrier and a second TB sent through a second carrier, wherein the first TB includes a first MAC CE and a second MAC CE, and the second TB includes a third MAC CE and a fourth MAC CE; the determining unit 420 is used for determining at least one MAC CE which is the same as the first MAC CE according to the second MAC CE, wherein the at least one MAC CE which is the same as the first MAC CE includes the third MAC CE; and the determining unit 420 is further used for determining at least one MAC CE which is the same as the third MAC CE according to the fourth MAC CE, wherein the at least one MAC CE which is the same as the third MAC CE includes the first MAC CE.

Optionally, the second MAC CE includes a second LCID field and a second serving cell index field, the fourth MAC CE includes a fourth LCID field and a fourth serving cell index field; and the determining unit 420 is specifically used for: determining the first MAC CE according to the second LCID field; determining a carrier on which each MAC CE in at least one MAC CE which is the same as the first MAC CE is located according to the second serving cell index field; determining the third MAC CE according to the fourth LCID field; and determining a carrier on which each MAC CE in at least one MAC CE which is the same as the third MAC CE is located according to the fourth serving cell index field.

Optionally, an index included in the second serving cell index field is an index of the second carrier, and an index included in the fourth serving cell index field is an index of the first carrier.

Optionally, the second MAC CE includes a second duplication number field, the fourth MAC CE includes a fourth duplication number field; and the determining unit 420 is specifically used for: determining a quantity of at least one MAC CE which is the same as the first MAC CE according to the second duplication number field; and determining a quantity of at least one MAC CE which is the same as the third MAC CE according to the fourth duplication number field.

Optionally, the second MAC CE includes a second LCID field and a second indication field, the fourth MAC CE includes a fourth LCID field and a fourth indication field; and the determining unit 420 is specifically used for: determining the first MAC CE according to the second LCID field; determining that the third MAC CE which is the same as the first MAC CE exists according to the second indication field; determining the third MAC CE according to the fourth LCID field; and determining that the first MAC CE which is the same as the third MAC CE exists according to the fourth indication field.

Optionally, the sending unit 430 is used for: sending an RRC message to the sending end device, before the receiving unit 410 receives the first TB sent by the sending end device through the first carrier and the second TB sent through the second carrier, wherein the RRC message is used for indicating the first carrier is used for transmitting the first MAC CE and the second carrier is used for transmitting the third MAC CE.

It should be understood that the receiving end device 400 according to the implementation of the present disclosure may correspondingly perform the method 200 in the implementations of the present disclosure, and the above and other operations and/or functions of each unit in the receiving end device 400 are respectively for achieving the corresponding flow of the receiving end device in each method in FIGS. 1 to 5, and will not be repeated here for the sake of brevity.

Therefore, the receiving end device of the implementation of the present disclosure receives the first TB in the first carrier and the second TB in the second carrier, wherein the first TB includes the first MAC CE and the second MAC CE, and the second TB includes the third MAC CE and the fourth MAC CE, the MAC CE which is the same as the first MAC CE may be determined according to the second MAC CE, and the MAC CE which is the same as the third MAC CE may be determined according to the fourth MAC CE, so that reception of duplicated MAC CEs transmitted through different carriers is achieved, reliability of transmission of a MAC CE is improved; and through another MAC CE, the receiving end device may be assisted to receive and identify the duplicated and transmitted MAC CEs, and to perform an operation behavior indicated by the MAC CE only once, and an erroneous operation may be avoided.

Figure 8:
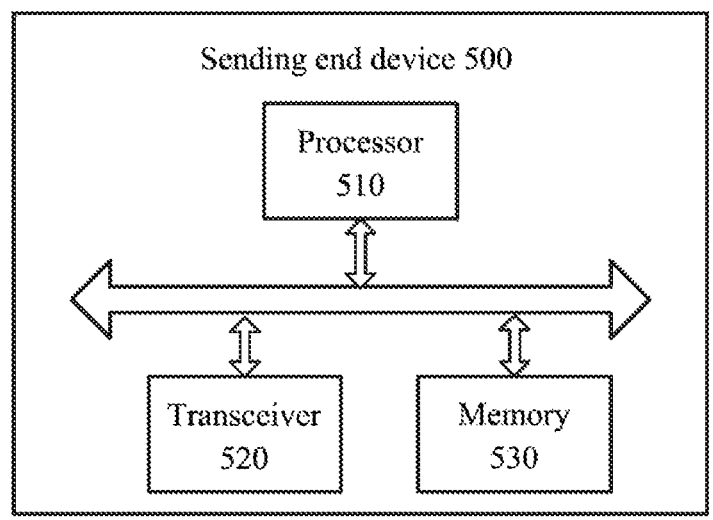
FIG. 8 is another schematic block diagram of a sending end device according to an implementation of the present disclosure.

FIG. 8 shows a schematic block diagram of a sending end device 500 according to an implementation of the present disclosure. As shown in FIG. 8, the sending end device 500 includes a processor 510 and a transceiver 520, wherein the processor 510 and the transceiver 520 are connected, and optionally, the sending end device 500 further includes a memory 530 wherein the memory 530 is connected to the processor 510. Herein, the processor 510, the memory 530, and the transceiver 520 communicate with each other through internal connection paths to transfer control and/or data signals. The memory 530 may be used for storing instructions. The processor 510 is used for executing the instructions stored in the memory 530 to control the transceiver 520 to send information or signals. The processor 510 is used for: encapsulating a first MAC CE and a second MAC CE to a first TB, and encapsulating a third MAC CE and a fourth MAC CE to a second TB, wherein the first MAC CE and the third MAC CE are the same MAC CE, the second MAC CE is used for indicating a MAC CE which is the same as the first MAC CE, and the fourth MAC CE is used for indicating a MAC CE which is the same as the third MAC CE; and the transceiver 520 is used for sending the first TB to a receiving end device through a first carrier and sending the second TB to the receiving end device through a second carrier.

Optionally, as one implementation, the second MAC CE includes a second LCID field and a second serving cell index field, wherein the second LCID field includes an LCID corresponding to the first MAC CE, and the second serving cell index field includes an index of a carrier on which each MAC CE in at least one MAC CE which is the same as the first MAC CE is located.

Optionally, as one implementation, the fourth MAC CE includes a fourth LCID field and a fourth serving cell index field, wherein the fourth LCID field includes an LCID corresponding to the third MAC CE, and the fourth serving cell index field includes an index of a carrier on which each MAC CE in at least one MAC CE which is the same as the third MAC CE is located.

Optionally, as one implementation, an index included in the second serving cell index field is an index of the second carrier, and an index included in the fourth serving cell index field is an index of the first carrier.

Optionally, as one implementation, the second MAC CE includes a second duplication number field, wherein the second duplication number field is used for indicating a quantity of at least one MAC CE which is the same as the first MAC CE.

Optionally, as one implementation, the fourth MAC CE includes a fourth duplication number field, and the fourth duplication number field is used for indicating a quantity of at least one MAC CE which is the same as the third MAC CE.

Optionally, as one implementation, the second MAC CE includes a second LCID field and a second indication field, wherein the second LCID field includes an LCID corresponding to the first MAC CE, and the second indication field is used for indicating that the third MAC CE which is the same as the first MAC CE exists.

Optionally, as one implementation, the fourth MAC CE includes a fourth LCID field and a fourth indication field, wherein the fourth LCID field includes an LCID corresponding to the third MAC CE, and the fourth indication field is used for indicating that the first MAC CE which is the same as the third MAC CE exists.

Optionally, as one implementation, the transceiver 520 is used for: receiving an RRC message sent by the receiving end device, before sending the first TB to the receiving end device through the first carrier and sending the second TB to the receiving end device through the second carrier, wherein the RRC message is used for indicating the first carrier is used for transmitting the first MAC CE and the second carrier is used for transmitting the third MAC CE.

It should be understood that the sending end device 500 according to the implementation of the present disclosure may correspond to the sending end device 300 in the implementation of the present disclosure and may correspondingly perform the corresponding body in the method 100 according to implementations of the present disclosure, and the above and other operations and/or functions of each unit in the sending end device 500 are respectively for achieving the corresponding flow of the sending end device in each method shown in FIGS. 1 to 5, and will not be repeated here for the sake of brevity.

Therefore, the sending end device of the implementation of the present disclosure encapsulates the first MAC CE and the second MAC CE in the first TB and transmits through the first carrier, and encapsulates the third MAC CE and the fourth MAC CE in the second TB and transmits through the second carrier, wherein the first MAC CE and the third MAC CE are the same MAC CE, the second MAC CE is used for indicating that the MAC CE which is the same as the first MAC CE exists, and the fourth MAC CE is used for indicating that the MAC CE which is the same as the third MAC CE exists, so that sending duplicated MAC CEs through different carriers is achieved, reliability of transmission of a MAC CE is improved; and through another MAC CE, the receiving end device may be assisted to receive and identify the duplicated and transmitted MAC CEs, so that the receiving end device only performs an operation behavior indicated by the MAC CE once, and an erroneous operation may be avoided.

Figure 9:
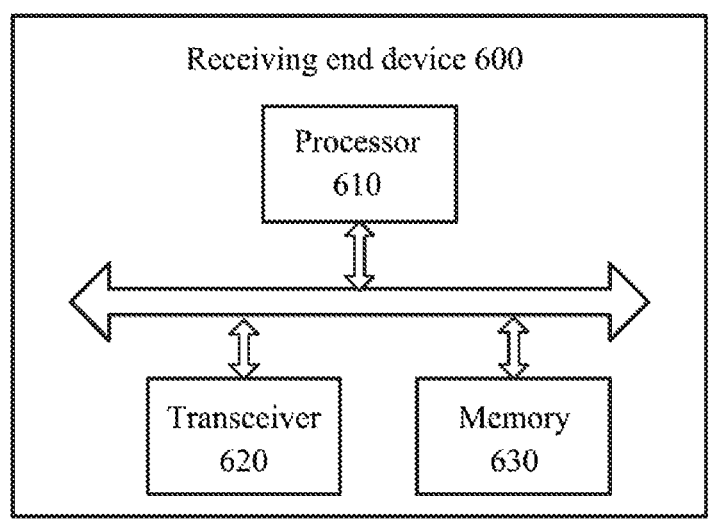
FIG. 9 is another schematic block diagram of a receiving end device according to an implementation of the present disclosure.

FIG. 9 shows a schematic block diagram of a receiving end device 600 according to an implementation of the present disclosure. As shown in FIG. 9, the receiving end device 600 includes a processor 610 and a transceiver 620, wherein the processor 610 and the transceiver 620 are connected; and optionally, the receiving end device 600 further includes a memory 630, wherein the memory 630 is connected to the processor 610. Herein, the processor 610, the memory 630, and the transceiver 620 communicate with each other through internal connection paths to transfer control and/or data signals. The memory 630 may be used for storing instructions. The processor 610 is used for executing the instructions stored in the memory 630 to control the transceiver 620 to send information or signals. The transceiver 620 is used for: receiving a first TB sent by a sending end device through a first carrier and a second TB sent through a second carrier, wherein the first TB includes a first MAC CE and a second MAC CE, and the second TB includes a third MAC CE and a fourth MAC CE; the processor 610 is used for: determining at least one MAC CE which is the same as the first MAC CE according to the second MAC CE, wherein the at least one MAC CE which is the same as the first MAC CE includes the third MAC CE; and the processor 610 is further used for: determining at least one MAC CE which is the same as the third MAC CE according to the fourth MAC CE, wherein the at least one MAC CE which is the same as the third MAC CE includes the first MAC CE.

Optionally, the second MAC CE includes a second LCID field and a second serving cell index field, the fourth MAC CE includes a fourth LCID field and a fourth serving cell index field; and the processor 610 is used for: determining the first MAC CE according to the second LCID field; determining a carrier on which each MAC CE in at least one MAC CE which is the same as the first MAC CE is located according to the second serving cell index field; determining the third MAC CE according to the fourth LCID field; and determining a carrier on which each MAC CE in at least one MAC CE which is the same as the third MAC CE is located according to the fourth serving cell index field.

Optionally, an index included in the second serving cell index field is an index of the second carrier, and an index included in the fourth serving cell index field is an index of the first carrier.

Optionally, the second MAC CE includes a second duplication number field, the fourth MAC CE includes a fourth duplication number field; and the processor 610 is used for: determining a quantity of at least one MAC CE which is the same as the first MAC CE according to the second duplication number field; and determining a quantity of at least one MAC CE which is the same as the third MAC CE according to the fourth duplication number field.

Optionally, the second MAC CE includes a second LCID field and a second indication field, the fourth MAC CE includes a fourth LCID field and a fourth indication field; and the processor 610 is used for: determining the first MAC CE according to the second LCID field; determining that the third MAC CE which is the same as the first MAC CE exists according to the second indication field; determining the third MAC CE according to the fourth LCID field; and determining that the first MAC CE which is the same as the third MAC CE exists according to the fourth indication field.

Optionally, the transceiver 620 is used for: sending an RRC message to the sending end device, before receiving the first TB sent by the sending end device through the first carrier and the second TB sent through the second carrier, wherein the RRC message is used for indicating the first carrier is used for transmitting the first MAC CE and the second carrier is used for transmitting the third MAC CE.

It should be understood that the receiving end device 600 according to the implementation of the present disclosure may correspond to the receiving end device 400 in the implementations of the present disclosure and may correspondingly perform the corresponding body in the method 200 according to the implementations of the present disclosure, and the above and other operations and/or functions of each unit in the receiving end device 600 are respectively for achieving the corresponding flow of the receiving end device in each method shown in FIGS. 1 to 5, and will not be repeated here for the sake of brevity.

Therefore, the receiving end device of the implementation of the present disclosure receives the first TB in the first carrier and the second TB in the second carrier, wherein the first TB includes the first MAC CE and the second MAC CE, and the second TB includes the third MAC CE and the fourth MAC CE, the MAC CE which is the same as the first MAC CE may be determined according to the second MAC CE, and the MAC CE which is the same as the third MAC CE may be determined according to the fourth MAC CE, so that reception of duplicated MAC CEs transmitted through different carriers is achieved, reliability of transmission of a MAC CE is improved; and through another MAC CE, the receiving end device may be assisted to receive and identify the duplicated and transmitted MAC CEs, and to perform an operation behavior indicated by the MAC CE only once, and an erroneous operation may be avoided.

It should be noted that the method implementations of the present disclosure may be applied to or implemented by a processor. The processor may be an integrated circuit chip with signal processing capability. In implementation processes, the actions of the method implementations may be completed by integrated logic circuits of hardware in the processor or instructions in a form of software. The processor may be a general purpose processor, a digital signal processor (DSP), an application specific integrated circuit (ASIC), a field programmable gate array (FPGA), or another programmable logic device, discrete gate or transistor logic device, or discrete hardware component. The processor may implement various methods, acts and logic block diagrams disclosed in the implementations of the present disclosure. The general purpose processor may be a microprocessor or the processor may be any conventional processor or the like. The actions of the method disclosed in connection with the implementation of the present disclosure may be directly embodied by the execution of the hardware decoding processor, or by the execution of a combination of hardware and software modules in a decoding processor. The software modules may be located in a storage medium commonly used in the art, such as a random access memory, a flash memory, a read-only memory, a programmable read-only memory, or an electrically erasable programmable memory, or a register. The storage medium is located in a memory, and the processor reads information in the memory and completes the actions of the methods in combination with its hardware.

It should be understood that the memory in the implementations of the present disclosure may be a transitory memory or non-transitory memory, or may include both a transitory memory and a non-transitory memory. The non-transitory memory may be a read-only memory (ROM), a programmable ROM (PROM), an erasable PROM (EPROM), an electrically erasable EPROM (EEPROM), or a flash memory. The transitory memory may be a Random Access Memory (RAM) which serves as an external cache. By illustration of example but not restriction, a RAM is available in many forms such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), and a Direct Rambus RAM (DR RAM). It should be noted that memories of the systems and methods described herein are intended to include, but are not limited to, these and any other suitable types of memories.

Those of ordinary skill in the art will recognize that example units and algorithm acts described in connection with the implementations disclosed herein may be implemented in electronic hardware, or a combination of computer software and electronic hardware. Whether these functions are implemented in hardware or software depends on a specific application and design constraint of the technical solutions. Skilled in the art may use different manners to realize the described functions for each particular application, but such realization should not be considered to be beyond the scope of the present disclosure.

Those skilled in the art may clearly understand that for convenience and conciseness of description, specific working processes of the systems, apparatuses, and units described above may refer to the corresponding processes in the method implementations, and details are not described herein again.

In several implementations provided by the present disclosure, it should be understood that the disclosed systems, apparatuses and methods may be implemented in other ways. For example, the apparatus implementations described above are only illustrative, for another example, the division of the units is only a logical function division, and there may be other division manners in actual realization. For example, multiple units or components may be combined or integrated into another system, or some features may be ignored or not executed. On the other hand, the mutual coupling or direct coupling or communication connection shown or discussed may be indirect coupling or communication connection through some interfaces, apparatuses or units, and may be in electrical, mechanical or other forms.

The units described as separated components may or may not be physically separated, and the components shown as units may or may not be physical units, i.e., they may be located in one place or may be allocated over multiple network units. Some or all of the units may be selected according to practical needs to achieve purposes of the solutions of the implementations.

In addition, various functional units in various implementations of the present disclosure may be integrated in one processing unit, or various units may be physically present separately, or two or more units may be integrated in one unit.

The functions may be stored in a computer readable storage medium if implemented in a form of a software functional unit and sold or used as a separate product. Based on this understanding, the technical solutions of the present disclosure, in essence, or the part contributing to the existing art, or the part of the technical solutions, may be embodied in the form of a software product stored in a storage medium, including several instructions for causing a computer device (which may be a personal computer, a server, or a network device, etc.) to perform all or part of the acts of the methods described in various implementations of the present disclosure. The aforementioned storage medium includes a U disk, a mobile hard disk, a read-only memory, a random access memory, a magnetic disk, or an optical disk, and another medium capable of storing program codes.

The foregoing are merely example implementations of the present disclosure, but the protection scope of the present disclosure is not limited thereto. Any person skilled in the art may easily conceive variations or substitutions within the technical scope disclosed by the present disclosure, which should be included within the protection scope of the present disclosure. Therefore, the protection scope of the present disclosure shall be the protection scope defined by the claims.

What we claim is:

1. A method for data transmission, comprising:
   encapsulating a first media access control (MAC) control element (CE) and a second MAC CE to a first transport block, and encapsulating a third MAC CE and a fourth MAC CE to a second transport block, wherein the first MAC CE and the third MAC CE are the same MAC CE, the second MAC CE is used for indicating a MAC CE which is the same as the first MAC CE, and the fourth MAC CE is used for indicating a same MAC CE which is the same as the third MAC CE; and
   sending the first transport block to a receiving end device through a first carrier, and sending the second transport block to the receiving end device through a second carrier.

2. The method according to claim 1, wherein the second MAC CE comprises a second logical channel ID (LCID) field and a second serving cell index field, wherein the second LCID field comprises an LCID corresponding to the first MAC CE, and the second serving cell index field comprises an index of a carrier on which each MAC CE in at least one MAC CE which is the same as the first MAC CE is located; and
   the fourth MAC CE comprises a fourth LCID field and a fourth serving cell index field, wherein the fourth LCID field comprises an LCID corresponding to the third MAC CE, and the fourth serving cell index field comprises an index of a carrier on which each MAC CE in at least one MAC CE which is the same as the third MAC CE is located.

3. The method according to claim 2, wherein an index comprised in the second serving cell index field is an index of the second carrier, and an index comprised in the fourth serving cell index field is an index of the first carrier.

4. The method according to claim 2, wherein the second MAC CE comprises a second duplication number field, wherein the second duplication number field is used for indicating a quantity of the at least one MAC CE which is the same as the first MAC CE,
the fourth MAC CE comprises a fourth duplication number field, wherein the fourth duplication number field is used for indicating a quantity of the at least one MAC CE which is the same as the third MAC CE.

5. The method according to claim 1, wherein the second MAC CE comprises a second logical channel ID (LCID) field and a second indication field, wherein the second LCID field comprises an LCID corresponding to the first MAC CE, and the second indication field is used for indicating that the third MAC CE which is the same as the first MAC CE exists,
   the fourth MAC CE comprises a fourth LCID field and a fourth indication field, wherein the fourth LCID field comprises an LCID corresponding to the third MAC CE, and the fourth indication field is used for indicating that the first MAC CE which is the same as the third MAC CE exists.

6. The method according to claim 5, wherein before sending the first transport block to the receiving end device through the first carrier and sending the second transport block to the receiving end device through the second carrier, the method further comprises:
   receiving a Radio Resource Control (RRC) message sent by the receiving end device, wherein the RRC message is used for indicating that the first carrier is used for transmitting the first MAC CE and the second carrier is used for transmitting the third MAC CE.

7. A sending end device, comprising a processor and a transceiver, wherein,
   the processor is configured to encapsulate a first media access control (MAC) control element (CE) and a second MAC CE to a first transport block, and encapsulate a third MAC CE and a fourth MAC CE to a second transport block, wherein the first MAC CE and the third MAC CE are the same MAC CE, the second MAC CE is used for indicating a MAC CE which is the same as the first MAC CE, and the fourth MAC CE is used for indicating a MAC CE which is the same as the third MAC CE; and
   the transceiver is configured to send the first transport block to a receiving end device through a first carrier and send the second transport block to the receiving end device through a second carrier.

8. The sending end device according to claim 7, wherein the second MAC CE comprises a second logical channel ID (LCID) field and a second serving cell index field, wherein the second LCID field comprises an LCID corresponding to the first MAC CE, and the second serving cell index field comprises an index of a carrier on which each MAC CE in at least one MAC CE which is the same as the first MAC CE is located; and
   the fourth MAC CE comprises a fourth LCID field and a fourth serving cell index field, wherein the fourth LCID field comprises an LCID corresponding to the third MAC CE, and the fourth serving cell index field comprises an index of a carrier on which each MAC CE in at least one MAC CE which is the same as the third MAC CE is located.

9. The sending end device according to claim 8, wherein an index comprised in the second serving cell index field is an index of the second carrier, and an index comprised in the fourth serving cell index field is an index of the first carrier.

10. The sending end device according to claim 8, wherein the second MAC CE comprises a second duplication number field, wherein the second duplication number field is used for indicating a quantity of the at least one MAC CE which is the same as the first MAC CE, the fourth MAC CE comprises a fourth duplication number field, wherein the fourth duplication number field is used for indicating a quantity of the at least one MAC CE which is the same as the third MAC CE.

11. The sending end device according to claim 7, wherein the second MAC CE comprises a second logical channel ID (LCID) field and a second indication field, wherein the second LCID field comprises an LCID corresponding to the first MAC CE, and the second indication field is used for indicating that the third MAC CE which is the same as the first MAC CE exists, the fourth MAC CE comprises a fourth LCID field and a fourth indication field, wherein the fourth LCID field comprises an LCID corresponding to the third MAC CE and the fourth indication field is used for indicating that the first MAC CE which is the same as the third MAC CE exists.

12. The sending end device according to claim 11, wherein, the transceiver is further configured to receive a Radio Resource Control (RRC) message sent by the receiving end device, before the transceiver sends the first transport block to the receiving end device through the first carrier and sends the second transport block to the receiving end device through the second carrier, wherein the RRC message is used for indicating the first carrier is used for transmitting the first MAC CE and the second carrier is used for transmitting the third MAC CE.

13. A receiving end device, comprising a processor and a transceiver, wherein, the transceiver is configured to receive a first transport block sent by a sending end device through a first carrier and a second transport block sent through a second carrier, wherein the first transport block comprises a first media access control (MAC) control element (CE) and a second MAC CE, and the second transport block comprises a third MAC CE and a fourth MAC CE;

the processor is configured to determine at least one MAC CE which is the same as the first MAC CE according to the second MAC CE, wherein the at least one MAC CE which is the same as the first MAC CE comprises the third MAC CE; and the processor is further configured to determine at least one MAC CE which is the same as the third MAC CE according to the fourth MAC CE, wherein the at least one MAC CE which is the same as the third MAC CE comprises the first MAC CE.

14. The receiving end device according to claim 13, wherein the second MAC CE comprises a second logical channel ID (LCID) field and a second serving cell index field, wherein the fourth MAC CE comprises a fourth LCID field and a fourth serving cell index field; and the processor is specifically configured to:
determine the first MAC CE according to the second LCID field;
determine a carrier on which each MAC CE in the at least one MAC CE which is the same as the first MAC CE is located, according to the second serving cell index field;
determine the third MAC CE according to the fourth LCID field; and
determine a carrier on which each MAC CE in the at least one MAC CE which is the same as the third MAC CE is located, according to the fourth serving cell index field.

15. The receiving end device according to claim 14, wherein an index comprised in the second serving cell index field is an index of the second carrier, and an index comprised in the fourth serving cell index field is an index of the first carrier.

16. The receiving end device according to claim 14, wherein the second MAC CE comprises a second duplication number field, and the fourth MAC CE comprises a fourth duplication number field; and the processor is specifically configured to:
determine a quantity of the at least one MAC CE which is the same as the first MAC CE, according to the second duplication number field; and
determine a quantity of the at least one MAC CE which is the same as the third MAC CE, according to the fourth duplication number field.

17. The receiving end device according to claim 13, wherein the second MAC CE comprises a second logical channel ID (LCID) field and a second indication field, wherein the fourth MAC CE comprises a fourth LCID field and a fourth indication field; and the processor is specifically configured to:
determine the first MAC CE according to the second LCID field;
determine that the third MAC CE which is the same as the first MAC CE exists, according to the second indication field;
determine the third MAC CE according to the fourth LCID field; and
determine that the first MAC CE which is the same as the third MAC CE exists, according to the fourth indication field.

18. The receiving end device according to claim 17, wherein, the transceiver is further configured to send a Radio Resource Control (RRC) message to the sending end device, before the transceiver receives the first transport block sent by the sending end device through the first carrier and the second transport block sent through the second carrier, wherein the RRC message is used for indicating the first carrier is used for transmitting the first MAC CE and the second carrier is used for transmitting the third MAC CE.

* * * * *